United States Patent Office

Re. 27,890
Reissued Jan. 15, 1974

27,890

PROTECTIVE COATING FOR METAL SURFACES

Edward Holbus, 6108 Greenleaf Blvd.,
Racine, Wis. 53406

No Drawing. Original No. 3,518,099, dated June 30, 1970, Ser. No. 792,862, Jan. 21, 1969, which is a continuation-in-part of abandoned Ser. No. 469,309, July 22, 1965. Application for reissue June 22, 1972, Ser. No. 265,263

Int. Cl. C08h *9/06;* C09g *1/08*

U.S. Cl. 106—10 9 Claims

Matter enclosed in heavy brackets [ ] appears in the original patent but forms no part of this reissue specification; matter printed in italics indicates the additions made by reissue.

ABSTRACT OF THE DISCLOSURE

For applying a self-polishing coating to an automobile body in a car wash as a separate application following wash and rinse:

Ranges of ingredients in preferred composition

3–10 parts by weight of carnauba wax
11–14 parts by weight of mineral oil
7–14 parts by weight of a cationic emulsifier
1–4 parts by weight of non-ionic emulsifier having 1–3 parts water soluble portion and ¼–1 part oil soluble portion
Sufficient water to bring 40 pounds of the foregoing ingredients to a total of 30 gallons in volume.

Procedure

The composition is emulsified by stirring the heated ingredients to make a concentrate. At the point of use the concentrate is usually diluted. Water is added and stirred. It is then sprayed on the surface to be protected at a temperature usually 120° F. or higher. The spraying is normally done with a vehicle of additional hot water.

When excess moisture is wiped off, a self-polishing glossy and protective coating is left on the surface. In a typical car wash using forty to fifty pounds pressure, the application may involve twelve to sixteen ounces of the dilute solution applied in about thirty seconds with about five to eight gallons of water.

CROSS REFERENCE TO RELATED APPLICATION

This application is a continuation in part of my application Ser. No. 469,309, filed July 22, 1965, now abandoned.

BACKGROUND OF INVENTION

It is recognized that a coating of hard wax on the finish of an automobile body or other metal surface enhances appearance and preserves the finish. However, previous wax coatings have required a first operation to spread the wax completely and uniformly over the cleaned automobile surface, and a buffing operation for polishing the wax. The buffing operation has required considerable effort.

Accordingly, attempts have been made to adapt an aqueous petroleum product emulsion for application as a spray during automobile washing. Petroleum products cause beading of the wash water on the automobile surface and give an oily gloss when the water runs off. The water repellent effect of the petroleum product soon disappears and buffing does not enhance the appearance.

Other products are disclosed in Pats. 3,088,158 and 3,222,213.

SUMMARY OF INVENTION

The present invention provides a coating of hard wax which is self-spreading and self-polishing and applied in a separate operation. The material spreads over a wet automobile surface in such form that it requires no rubbing. It is not even wiped except to remove the droplets of water from the vehicle. Moreover, the coating increases in adhesion with the passage of time up to a period of two or three days.

The essential elements responsible for this result are believed to be the carnauba wax and the cationic emulsifier. The results are best if the emulsion is applied hot, the temperature of the emulsion, as distinguished from that of the spray vehicle, being at least 50° C.

DESCRIPTION OF PREFERRED EMBODIMENT

The preferred ranges of proportions are indicated in the Abstract of Disclosure. In the following specific formulae, the non-ionic surfactant in the formulation of the invention is supplied by the Stepan Chemical Company of Northfield, Ill., under the trademark of the Makon series. The Makon series are non-ionic surfactants, chemically (nonyl phenoxy polyoxyethylene ethanol). These surfactants are prepared by the reaction of nonyl phenol with ethylene oxide. The Makon 4 contains 4 mols of ethylene oxide. Makon 10 contains 10 mols of ethylene oxide.

Formulation No. 1

| Component: | Weight percent |
|---|---|
| Carnauba wax | 4 |
| Mineral spirits | 7 |
| Non-ionic surfactant: | |
| Makon 4 | .25 |
| Makon 10 | .75 |
| Cationic emulsifier: | |
| Aliphatic amine acetate | 7 |
| Water | 81 |

The added water makes a concentrated solution totalling 30 gallons.

*In the foregoing formulation, the wax constitutes 21% by weight of the active ingredients, the mineral spirits constitute 37% by weight, the non-ionic surfactants constitute 5% by weight, and the cationic emulsifier constitutes 37% by weight.*

Formulation No. 2

| Component: | Weight percent |
|---|---|
| Carnauba wax | 8 |
| Mineral spirits | 14 |
| Non-ionic emulsifier: | |
| Makon 4 | .5 |
| Makon 10 | 1.5 |
| Cationic emulsifier: | |
| Aliphatic amine acetate | 14 |
| Water | 62 |

The added water makes a concentrated solution totalling 30 gallons.

*The foregoing formulation includes about 21% by weight wax, about 37% by weight mineral spirits, about 5% by weight non-ionic emulsifiers and about 37% by weight of the cationic emulsifier, based on the total active ingredients.*

Formulation No. 2 is made the same as Formulation No. 1. However, used in a car wash it should be heated above 50° C. and stirred because the material is thick. The water temperature in the vehicle line should be 5–10° C. warmer than the wax mixture.

Desired procedure of preparing Formulation 1 or 2 is illustrated below:

The aliphatic amine acetate (cationic emulsifier) and half of the mineral spirits are heated in a container to 80° C.

The wax, non-ionic surfactant and half of the mineral spirits are heated in a separate container to 100° C.

When these two separate containers of the above mixtures reach their prescribed temperature, they are poured into a separate preheated container. The best results are achieved when the aliphatic amine acetate and mineral spirits mixture is poured into the heater first and then the wax mixture. This combined mixture is stirred gently for approximately two minutes. It is then poured into a container of water which approaches 95° C. If the heat is excessive, the reaction may be violent. This final mixture then is stirred and agitated for approximately 15–20 minutes.

The thirty gallon concentrate can be extended with a like amount of additional water. Used in a car wash, the concentrated or diluted formulation is desirably heated to a temperature of about 38°–76° C. Such heating is not absolutely essential. It can be used at ambient temperature. In that event, the composition is siphoned or pumped into a water line that contains water at a temperature in excess of 60° C. It is again extended with sufficient water so that amount of concentrate actually is about eight to twelve ounces per car and thirty seconds required for the washing operation.

The spray arch usually contains approximately seven spray nozzles whose angle of spray is between 80° and 100°. When sprayed, preferably hot, onto a car, the wax plates out and adheres to the clean metal surface. The remaining droplets of water are removed with a blast of air or minor wiping. The surface is now waxed and assumes high polish.

While waxing of vehicle bodies has been referred to for exemplification, it will be understood that the wax composition and procedures can be used to put wax coatings on other pre-cleaned surfaces. The small amount of time required to wax a car is particularly noteworthy.

Formulation No. 3

| Component: | Weight percent |
|---|---|
| Carnauba wax | 4 |
| Mineral spirits | 7 |
| Non-ionic surfactant: | |
| Makon 4 | .25 |
| Makon 10 | .75 |
| Cationic emulsifier: | |
| Aliphatic amine acetate | 4 |
| Dicoco dimethyl ammonium chloride | 4 |
| [Water | 0 |

The added water makes a concentrated solution totalling 30 gallons.]

*Sufficient water is added to bring forty pounds of the foregoing active ingredients to thirty gallons in volume.*

*In the foregoing formulation, the wax constitutes 20% by weight of the active ingredients, the mineral spirits constitute 35% by weight, the non-ionic surfactants constitute 5% by weight, and the cationic emulsifiers constitute 40% by weight.*

Formulation No. 3 is prepared in a similar manner as No. 1 with the following exception: The quaternary ammonium chloride is mixed with 25% of the mineral spirits and added to the formula after the water has been added and cooled to room temperature.

In either case the preferred procedure is as follows:

Step I.—Carnauba wax, non-ionic surfactant and mineral spirits are heated to 100° C.

Step II.—The amine acetate and mineral spirits are heated to 80° C.

Step III.—These are blended and mixed together.

Step IV.—They are added to the water and stirred and packaged.

Step V.—The wax is sprayed onto a car using hot water as the vehicle.

In the emulsifiers, the acetate salts are preferred because they result in more stable emulsion than quaternary ammonium salts. The formulation indicated is easily balanced to secure the best combination of hydrophilic and lipophilic characteristics (HLB) for the present purposes.

The carnauba wax gives very notably superior results, particularly in the hardness and self-polishing.

The cationic emulsifier is believed to be responsible for the observed high degree of adhesion to the metal.

Among the cationic emulsifiers which are not only usable but within a satisfactory price range are:

Cationic emulsifiers dimethyl di (hydrogenated-tallow) ammonium chloride (75%)
dimethyl di (coco) ammonium chloride (75%)
trimethyl (tallow) ammonium chloride (50%)
aliphatic amine acetates In any case, the composition is applied as an independent fine hot spray. The temperature range normally is above 38° C. and below 76° C. The wax spray may be controlled and applied automatically without manpower to cover the entire surface with minimum runoff. The few droplets remaining on the treated surface are readily wiped off in conventional drying procedure.

I claim:

1. A wax and oil-in-water emulsion for spray coating automobiles, consisting essentially of a wax in the amount of 3–10 lbs. carnauba wax, a liquid mineral oil in the amount of 7–14 lbs., a cationic emulsifier in the amount of 7–14 lbs., a non-ionic emulsifier consisting of nonyl phenoxy polyoxyethylene ethanol having 1–3 lbs. water soluble and ¼–1 lb. oil soluble portions, and water in approximate amount to bring 40 lbs. of the other constituents to 30 gal. in volume.

2. The wax and oil-in-water emulsion of claim 1 in which the liquid mineral-oil is a naphtha.

3. The wax and oil-in-water emulsion of claim 1 in which the cationic emulsifier is of the group consisting of quaternary ammonium acetates and chlorides and [quinidine salts.] *aliphatic amine acetates.*

4. The wax and oil-in-water emulsion of claim 1 in which the non-ionic emulsifier consists essentially of nonyl phenoxy polyoxyethylene alcohols.

5. A wax and oil-in-water emulsion according to claim 1 in which the emulsion has a temperature above 38° C. and below [78° C.] *76° C.*

*6. A concentrate for dilution with hot water to form a spray coating for automobiles, said concentrate consisting essentially of a wax and oil-in-water emulsion containing for every 40 parts by weight of the following active ingredients, from 3 to 10 parts by weight of carnauba wax, from 7 to 14 parts by weight of an emulsifiable oil, from 7 to 14 parts by weight of a cationic emulsifier, and 1 to 4 parts by weight of a non-ionic emulsifier having both hydrophilic and lipophilic properties.*

*7. The concentrate of claim 6 in which for every 20 parts by weight of carnauba wax in the active ingredients there are about 35 to 37 parts by weight of said oil, about 37 to 40 parts by weight of the cationic emulsifier and about 5 parts by weight of the non-ionic emulsifier.*

*8. The concentrate of claim 6 in which said non-ionic emulsifier has surface active properties substantially equivalent to those of a mixture containing 3 parts by weight of a nonyl phenoxy polyethylene ethanol containing 10 mols of ethylene oxide per molecule and 1 part by weight of a nonyl phenoxy polyoxyethylene ethanol containing 4 mols of ethylene oxide per molecule.*

*9. The concentrate of claim 6 in which said emulsifiable oil is a mineral oil.*

References Cited

The following references, cited by the Examiner, are of record in the patented file of this patent or the original patent.

UNITED STATES PATENTS

| | | | |
|---|---|---|---|
| 2,626,870 | 1/1953 | Cooke et al. | 106—10 |
| 3,088,158 | 5/1963 | Boyle et al. | 106—10 X |
| 3,222,201 | 12/1965 | Boyle et al. | 106—285 |
| 3,222,213 | 12/1965 | Clark et al. | 106—285 X |
| 3,497,365 | 2/1970 | Atherton et al. | 106—8 |
| 3,551,168 | 12/1970 | Atherton et al. | 106—8 |

JOSEPH L. SCHOFER, Primary Examiner

J. B. EVANS, Assistant Examiner

U.S. Cl. X.R.

106—11, 271, 285, 14

UNITED STATES PATENT OFFICE

CERTIFICATE OF CORRECTION

Patent No. Re. 27,890 Dated January 15, 1974

Inventor(s) Edward Holbus

It is certified that error appears in the above-identified patent and that said Letters Patent are hereby corrected as shown below:

Column 4, after line 31, "(trimethyl (tallow) ammonium chloride (50%)
the following has been omitted:
"monoalkyl quaternary ammonium salts"

Signed and sealed this 10th day of September 1974.

(SEAL)
Attest:

McCOY M. GIBSON, JR.
Attesting Officer

C. MARSHALL DANN
Commissioner of Patents